United States Patent
Abe et al.

(10) Patent No.: US 8,249,678 B2
(45) Date of Patent: Aug. 21, 2012

(54) WIRELESS COMMUNICATION DEVICE WITH CONFIGURABLE ANTENNA

(75) Inventors: Yasuhiro Abe, Kanagawa (JP); Kenji Waku, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 872 days.

(21) Appl. No.: 12/239,700

(22) Filed: Sep. 26, 2008

(65) Prior Publication Data

US 2009/0111379 A1    Apr. 30, 2009

(30) Foreign Application Priority Data

Sep. 28, 2007  (JP) ................................. 2007-253860
Sep. 4, 2008   (JP) ................................. 2008-226705

(51) Int. Cl.
    *H04Q 7/32* (2006.01)
(52) U.S. Cl. ............... 455/575.5; 455/550.1; 455/552.1; 455/553.1; 455/556.1; 343/702; 343/720; 343/729; 343/725; 343/901
(58) Field of Classification Search ............... 455/575.5, 455/550.1, 556.1, 556.2, 557, 552.1, 553.1, 455/41.1, 41.2, 41.3, 422.1, 403, 73, 90.1–90.3; 343/702, 720, 729, 725, 901

See application file for complete search history.

(56) References Cited

U.S. PATENT DOCUMENTS

| | | | |
|---|---|---|---|
| 6,054,959 A * | 4/2000 | Amos et al. | 343/702 |
| 7,894,771 B2 * | 2/2011 | Son et al. | 455/41.3 |
| 2006/0281423 A1 * | 12/2006 | Caimi et al. | 455/129 |
| 2011/0128205 A1 * | 6/2011 | Rofougaran | 343/859 |

FOREIGN PATENT DOCUMENTS

| JP | 2004-179995 | 6/2004 |
|---|---|---|
| JP | 2004-363863 | 12/2004 |

* cited by examiner

*Primary Examiner* — Keith Ferguson
(74) *Attorney, Agent, or Firm* — Morrison & Foerster LLP (57) ABSTRACT

A wireless communication device having a configurable antenna, includes: a first antenna having a first resonant frequency; a first frequency modification unit for modifying the first resonant frequency of the antenna; a function operation unit activating a plurality of functions; and a control unit controlling the first frequency modification unit to modify the first resonant frequency in accordance with a function activated by the function operation unit.

17 Claims, 8 Drawing Sheets

WIRELESS COMMUNICATION DEVICE WITH CONFIGURABLE ANTENNA

CROSS-REFERENCE TO RELATED APPLICATIONS

The present application claims priority under 35 U.S.C. §119 to Japanese Patent Application No. 2007-253860, filed Sep. 28, 2007, entitled "COMMUNICATION APPARATUS," the entirety of which is incorporated by reference herein. The present application also claims priority under 35 U.S.C. §119 to Japanese Patent Application No. 2008-226705, filed on Sep. 4, 2008, entitled "COMMUNICATION APPARATUS," the entirety of which is incorporated by reference herein.

BACKGROUND OF THE INVENTION

1. Field of the Invention

The present invention relates to wireless communication devices and, more particularly, to wireless communications devices having a reconfigurable antenna.

2. Description of the Related Art

In recent years, wireless communication devices have included a variety of software applications installed on them that allow them not only to make phone calls but also to send and receive text messages, browse the Internet, send and receive videophone calls, and so forth.

The "use state" of such communication devices varies depending on the type of activated application. For example, when placing a phone call, a user uses the communication device by pressing the device against his or her ear and mouth while holding the equipment with his or her hand. Further, when using a text message function or an Internet browsing function, the user manually operates an operation unit (e.g., an alphanumeric keypad) of the communication device while holding the device with his or her hand and viewing a display of the device.

During operation of the operation unit by the user, an antenna of the device may be covered by a hand of the user, for example. If the area provided with the antenna is covered by a hand, the resonant frequency of the antenna may be reduced and the antenna's performance may be detrimentally affected.

To prevent antenna performance from being adversely impacted depending on the device's use state, it has been proposed to provide a sensor for detecting contact by a human body portion (e.g., hand or head) and thereafter selecting an antenna from a plurality of antennas capable of providing improved antenna performance. However, the structure of such communication devices having a plurality of antennas is complex and costly.

Thus, a communication device capable of providing improved antenna performance without involving such complex structures is desired.

BRIEF SUMMARY OF THE INVENTION

The invention addresses the above and other needs by providing a wireless communication device and method that allows adjustment of the resonant frequency of an antenna based on a determined use state of the device.

In one embodiment, a wireless communication device having a configurable antenna, includes: a first antenna having a first resonant frequency; a first frequency modification unit for modifying the first resonant frequency of the antenna; a function operation unit activating a plurality of functions; and a control unit controlling the first frequency modification unit to modify the first resonant frequency in accordance with a function activated by the function operation unit.

In another embodiment, a wireless communication device having a plurality of functions, includes: a first antenna; a function activator activating one of the plurality of functions; and a frequency modifier for modifying a first resonant frequency of the first antenna in accordance with a type of function activated. In a further embodiment, the wireless communication device includes a second antenna having a second resonant frequency, wherein the plurality of functions include one or more short-distance communication functions using the second antenna for transmitting or receiving radio signals.

DETAILED DESCRIPTION OF EXEMPLARY EMBODIMENTS

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

Figure 1:
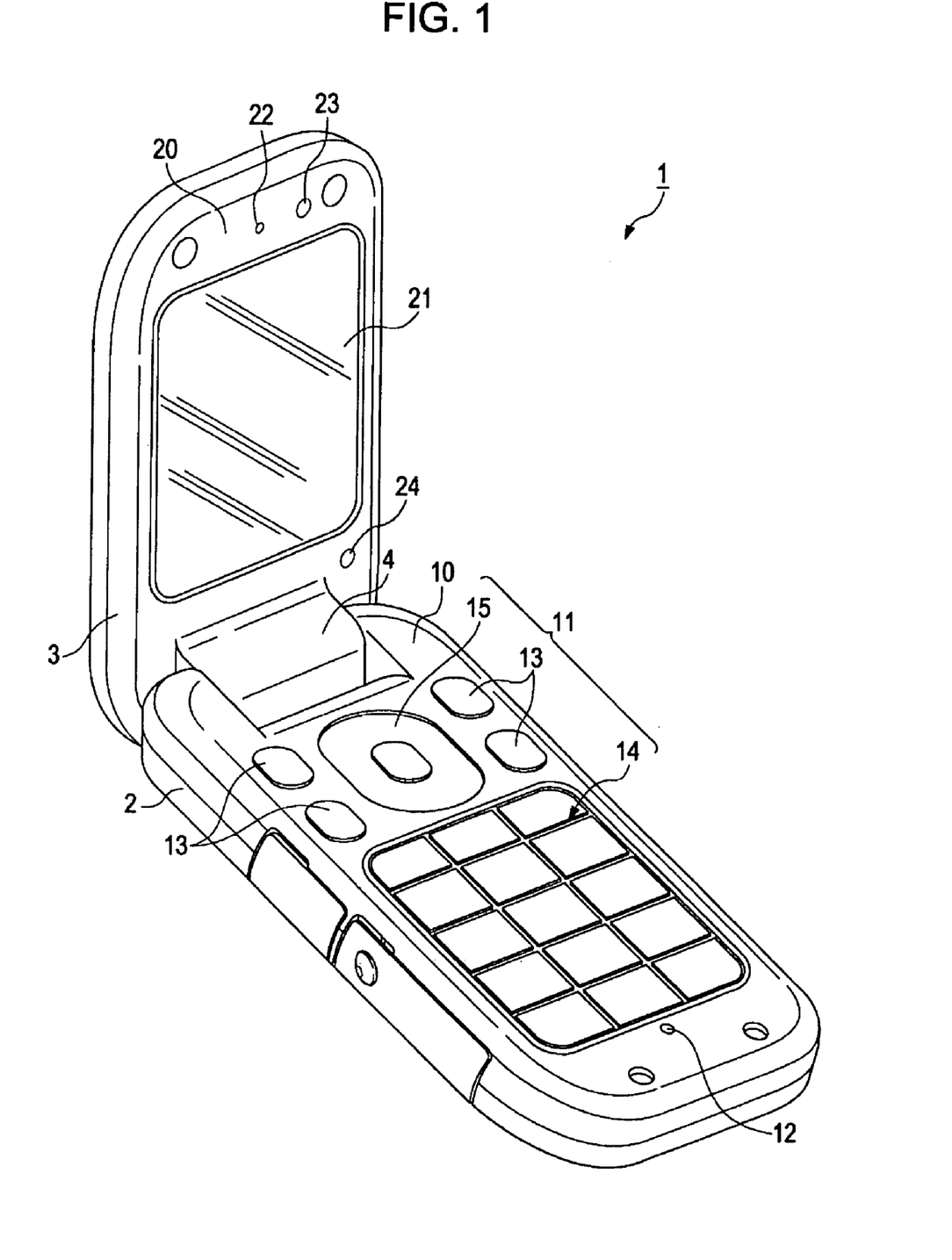
FIG. 1 is an external perspective view of a cellular phone, according to one embodiment of the invention.

Referring to FIG. 1, an exemplary cellular phone apparatus 1 is illustrated, in accordance with one embodiment of the invention. The cellular phone apparatus 1 includes a first casing portion 2 and a second casing portion 3. The first casing portion 2 includes a first casing surface 10. The first casing portion 2 has a group of operation buttons 11 and a microphone 12 on the first casing surface 10. A voice of a user of the cellular phone apparatus 1 who is making a call is input to the microphone 12. The group of operation buttons 11 includes function setting buttons 13 for setting and activating various settings including an address book function and a text message function, input operation buttons 14 for entering numerals for phone numbers and characters for text messages, and decision making buttons 15 for making decisions in various operations. The decision making buttons 15 also performs scrolling operations.

The second casing portion 3 includes a second casing surface 20, a display 21 which displays various items of information, an image pick-up unit 23 and a speaker 24 which outputs sound or music on the second casing surface 20. The image pick-up unit 23 includes a charge coupled device (CCD) such as a camera which takes an image of an object.

In one embodiment, the image pick-up unit 23 is arranged such that a shooting direction is perpendicular to the display 21. Therefore, the shooting direction is the same as the facing direction of a user's face who holds and operates the cellular phone apparatus 1 when he or she faces the display 21. In FIG. 1, the image pick-up unit 23 is arranged on the second casing surface 20 of the second casing portion 3. Alternatively, the image pick-up unit 23 may be arranged on the first casing surface 10 of the first casing portion 2. In this case, the shooting direction can be aligned with the direction of user's faces, or other desired directions.

An upper portion of the first casing portion 2 and a lower portion of the second casing portion 3 are connected to each other via a hinge 4. The cellular phone apparatus 1 can be in an open state and in a closed state by relatively moving the first casing portion 2 and the second casing portion 3 using the hinge 4 as a pivot point. In the open state, both the first casing portion 2 and the second casing portion 3 are opened. In the closed state, the first casing portion 2 and the second casing portion 3 are closed.

In the above-described embodiment, a folding-type cellular phone apparatus is described. Alternatively, the cellular phone apparatus 1 may be a slide type, a rotation type or a straight type of device. In the slide type, the first casing portion 2 can slide with respect to the second casing portion 3 to place the cellular phone 1 in open and closed configurations. In a rotation type, one of the first casing portion 2 and the second casing portion 3 can be rotated around an axis along a desired direction in which the first casing portion 2 and the second casing portion 3 may be rotated with respect to one another. In a straight type, the first casing portion 2 and the second casing portion 3 are disposed in a single casing.

In further embodiments, the present invention may be implemented in a personal handy phone system (PHS), a personal data assistant (PDA), a portable navigation apparatus, a personal computer, a portable game machine with a wireless function, and so on.

Figure 2:
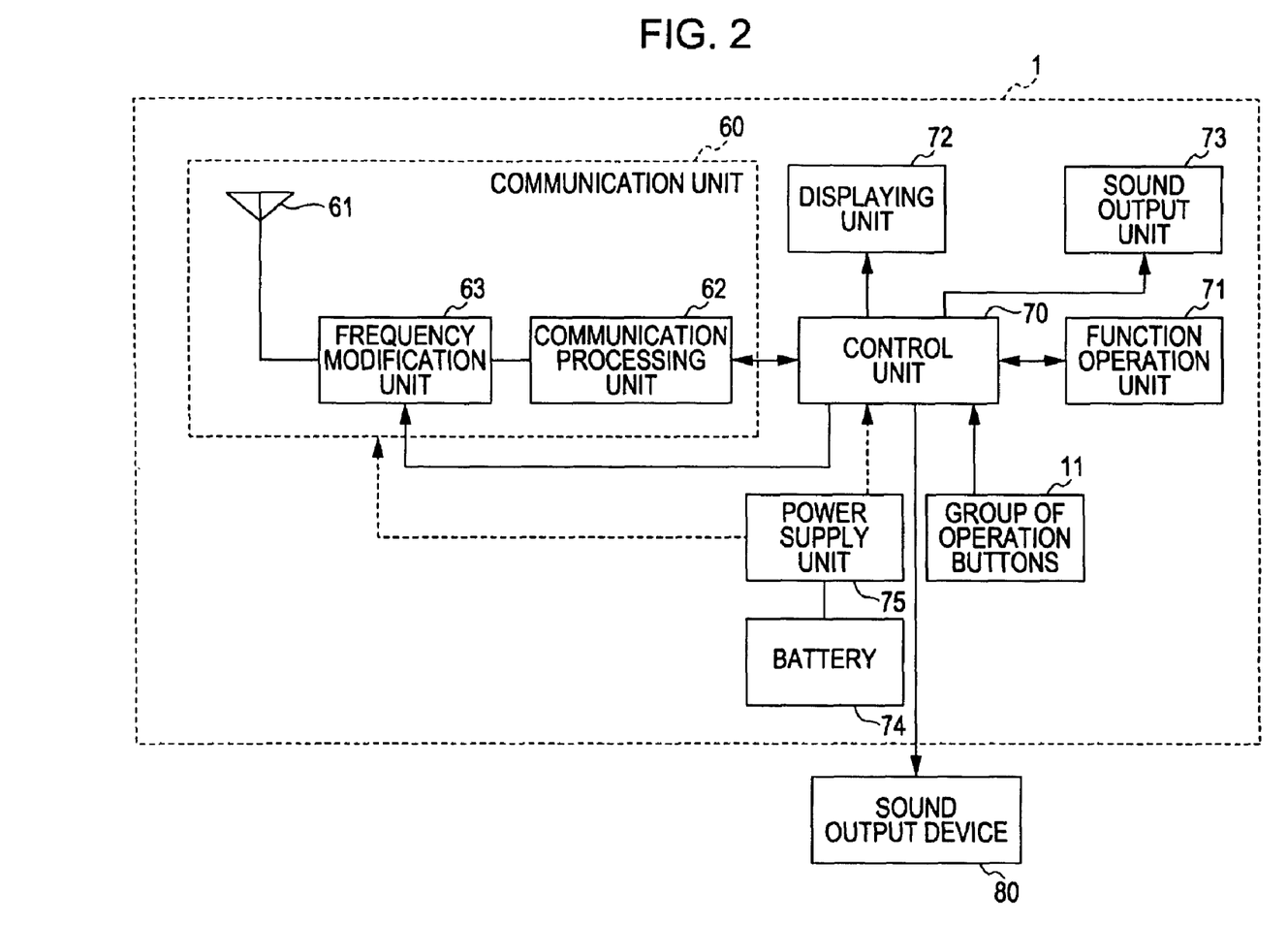
FIG. 2 is a functional block diagram of a cellular phone, according to one embodiment of the invention.

FIG. 2 is a functional block diagram of a cellular phone, in accordance with one embodiment of the invention. It is understood that these functional blocks may be implemented along with additional functional blocks, components or parts found in conventional communication devices. As shown in FIG. 2, the cellular phone apparatus 1 includes a group of operation buttons 11, a first communication unit 60, a control unit 70, function operation unit 71, a displaying unit 72, a sound output unit 73, a battery 74 with a predetermined capacity and a power supply unit 75. The first communication unit 60 communicates with an external terminal. The control unit performs predetermined operations. The power supply unit 75 converts power supplied from the battery 74 to a predetermined voltage and supplies the converted power to the first communication unit 60 and the control unit 70.

The first communication unit 60 includes a main antenna 61, a first communication processing unit 62, and a first frequency modification unit 63. The main antenna 61 communicates with an external apparatus in a predetermined usable frequency band. The first communication processing unit 62 performs signal processing such as modulation processing or demodulation processing. The first frequency modification unit 63 modifies the resonant frequency fc (first frequency) of the main antenna 61.

The main antenna 61 communicates with an external apparatus (e.g., a base station) in a predetermined usable frequency band (e.g., 800 MHz). In one embodiment, the predetermined usable frequency band is set to 800 MHz. However, other frequency bands may be used. Further, the main antenna 61 may be configured as a so-called dual band type capable of responding to a second usable frequency band (e.g., 2 GHz) as well as to the predetermined usable frequency band, or as a multiple band type capable of responding to a third usable frequency band.

The first communication processing unit 62 performs the demodulation processing on a signal received by the main antenna 61, and supplies the processed signal to the control unit 70. Further, the first communication processing unit 62 performs the modulation processing on a signal supplied by the control unit 70, and transmits the processed signal to the external apparatus (the base station) via the main antenna 61.

The first frequency modification unit 63 modifies the resonant frequency of the main antenna 61 to a higher frequency or a lower frequency in accordance with a control signal sent by the control unit 70.

The control unit 70 includes one or more processors (not shown) and memories (not shown) for performing predetermined operations that control the function operation unit 71. Therefore, the control unit 70 can determine a currently activated function through the function operation unit 71.

The function operation unit 71 activates a predetermined function in accordance with one or more control signals received from the control unit 70. For example, in the reception of a phone call, the function operation unit 71 activates a phone call function upon a predetermined operation of the group of operation buttons 11 by the user. Further, the function operation unit 71 activates a text message function or an Internet browsing function in accordance with the operation of the group of operation buttons 11.

The displaying unit 72 displays predetermined information in accordance with one or more control signals received from the control unit 70. For example, upon receipt of a phone call or a text message, the displaying unit 72 displays a message notifying the receipt of the phone call or the text message. Further, upon activation of the text message function by the function operation unit 71, the displaying unit 72 displays a mailer (an application for reading and writing text messages).

The sound output unit 73 includes the sound output unit 22 and the speaker 24, and outputs a sound in accordance with one or more control signals received from the control unit 70.

The power supply unit 75 converts a power supply voltage supplied by the battery 74 to a predetermined value of voltage, and supplies the converted power supply voltage to the first communication unit 60, the control unit 70, and so forth.

Figure 3A:
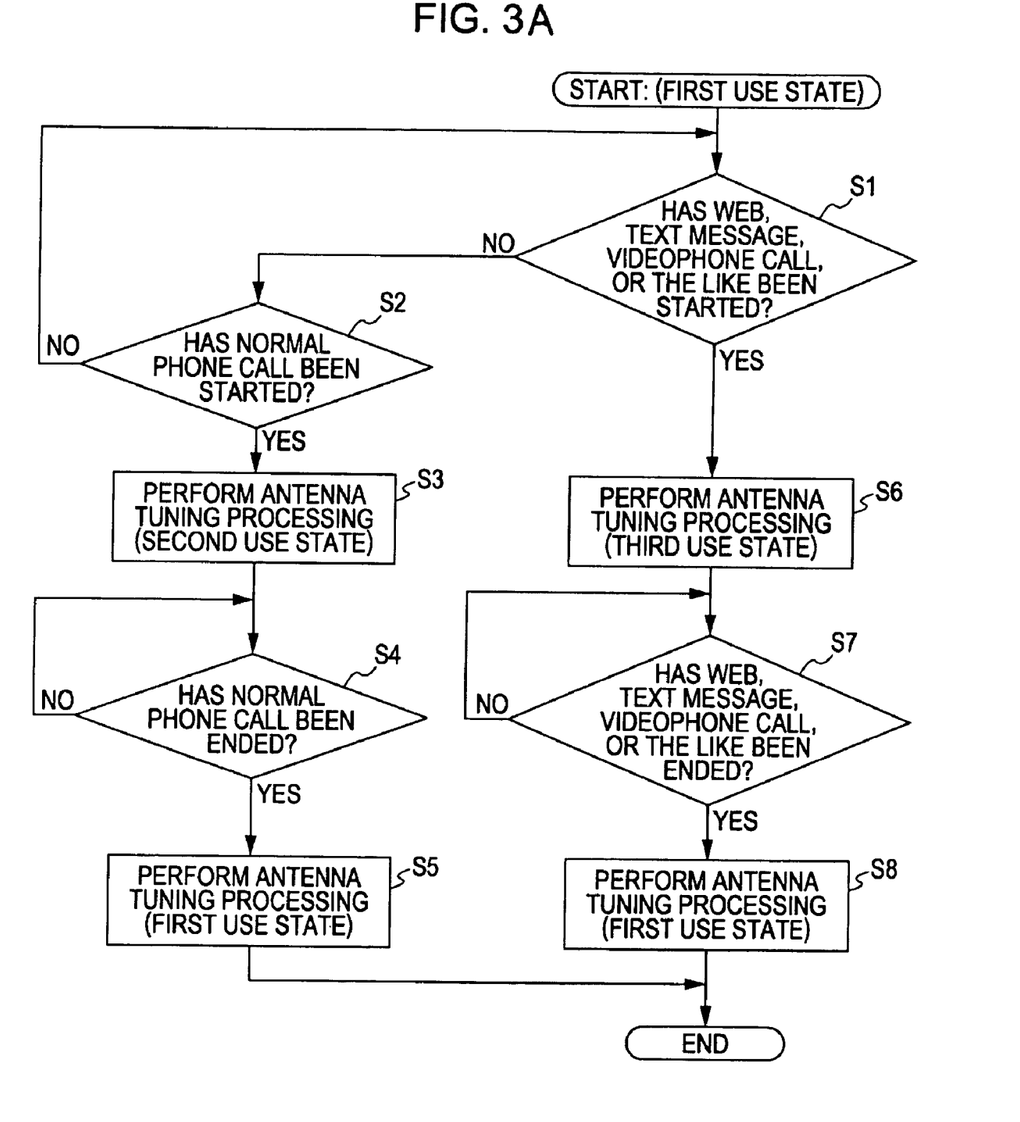
FIGS. 3A and 3B are flowcharts of operations performed by a control unit of a cellular phone according to various embodiments of the invention.

Herein, an operation of the control unit 70 is described with reference to the flowchart of FIG. 3A. In the following description, a "first use state" represents an activated state of a normal standby function activated by the function operation unit 71, i.e., a state in which the user is not assumed to be holding the cellular phone apparatus 1 in his or her hand. Further, a "second use state" represents an activated state of a function accompanying sound output by the sound output unit 73 (one of a plurality of specific functions), which indicates a normal phone call function, for example, i.e., a state in which the user is assumed to be holding the cellular phone apparatus 1 in his or her hand and pressing the apparatus against his or her face to catch the sound output by the sound output unit 73. Further, a "third use state" represents an activated state of a predetermined function activated by the function operation unit 71 when the displaying unit 72 displays text and/or images to perform a text message function, an Internet browsing function (Web function), a videophone call function, a hands-free call function, a function accompanying operation of the group of operation buttons 11, etc. This "third state" indicates a state in which the user is assumed to be viewing the displaying unit 72 while holding the cellular phone apparatus 1 in his or her hand, or to be operating the group of operation buttons 11 without pressing the cellular phone apparatus 1 against his or her face. In one embodiment, the control unit 70 periodically monitors and determines the respective use states of the cellular phone apparatus 1. Further, it is assumed that the cellular phone apparatus 1 is currently in the first use state, and that the first resonant frequency fc of the main antenna 61 is a predetermined frequency (e.g., 800 MHz).

At Step S1, the control unit 70 determines whether or not the use state has shifted to the use state of functions other than a phone call function, for example, to a use state of the Web function, the text message function, or the like (the third use state). If the use state has shifted to the use state of these functions which is in the third use state (YES), the procedure proceeds to Step S6. If the use state has not shifted to the use state of these functions which is out of the third use state (NO), the procedure proceeds to Step S2.

At Step S2, the control unit 70 determines whether or not the use state has shifted to the use state of the phone call function (the second use state). If the use state has shifted to the second use state (YES), the procedure proceeds to Step S3. If the use state has not shifted to the second use state (NO), the procedure returns to Step S1.

At Step S3, the control unit 70 performs antenna tuning processing. Specifically, the control unit 70 controls the first frequency modification unit 63 to modify the resonant frequency fc of the main antenna 61 to a second frequency, which is higher than the resonant frequency fc and a first frequency later described.

Accordingly, if the phone call function is activated and the cellular phone apparatus 1 is pressed against the face of the user, and thus if the resonant frequency fc of the main antenna 61 is reduced, the first frequency modification unit 63 modifies the resonant frequency fc to the second frequency, which is higher than the resonant frequency fc, under the control by the control unit 70. As a result, the deterioration in the radiation efficiency of the main antenna 61 is suppressed.

At step S4, the control unit 70 determines whether or not the use state of the normal phone call (the second use state) has been ended. If the second use state has been ended (YES), the procedure proceeds to Step S5. If the second use state has not been ended (NO), the procedure returns again to Step S4.

At Step S5, the control unit 70 performs antenna tuning processing. Specifically, the control unit 70 controls the first frequency modification unit 63 to modify the second frequency of the main antenna 61, which has been modified in the process of Step S3, to the original resonant frequency fc.

At Step S6, the control unit 70 performs antenna tuning processing. Specifically, the control unit 70 controls the first frequency modification unit 63 to modify the resonant frequency fc of the main antenna 61 to the first frequency, which is higher than the resonant frequency fc.

In the third use state, the user is assumed to be viewing the displaying unit 72 or operating the group of operation buttons 11 while holding the cellular phone apparatus 1 in his/her hand. However, unlike the second use state, the user is not assumed to be pressing the cellular phone apparatus 1 against his/her face. Thus, the cellular phone apparatus 1 is more distant from the human body in the third use state than in the second use state. That is, the degree of reduction in the resonant frequency fc of the main antenna 61 is understood to be smaller in the third use state than in the second use state.

In the third use state, the control unit 70 controls the first frequency modification unit 63 to modify the resonant frequency fc of the main antenna 61 up to the first frequency, which is higher than resonant frequency fc. However, unlike the second use state, the resonant frequency fc of the main antenna 61 is not modified up to the second frequency. That is, the first frequency is lower than the second frequency.

Accordingly, the deterioration in the sensitivity of the main antenna 61 in the third use state is appropriately suppressed.

At Step S7, the control unit 70 determines whether or not the use state of the Web, the text message, or the like (the third use state) has been ended. If the third use state has been ended (YES), the procedure proceeds to Step S8. If the third use state has not been ended (NO), the process of Step S7 is repeated.

At Step S8, the control unit 70 performs antenna tuning processing. Specifically, the control unit 70 controls the first frequency modification unit 63 to modify the first frequency of the main antenna 61, which has been modified in the process of Step S6, to the original resonant frequency fc.

As illustrated in FIG. 2, the function operation unit 71 may be configured to activate a function accompanying sound output by an external sound output device 80 (e.g., earphones used to listen to music, an external speaker, and so forth).

In the use of the external sound output device 80 as described above, the cellular phone apparatus 1 is assumed to be held by a hand of the user, subjected to a predetermined operation enabling the use of the external sound output device 80, and thereafter placed on a desk or the like to be brought in a state in which the cellular phone apparatus 1 is no longer held in the hand of the user (a state close to the first use state). In other words, in one embodiment, when the function using the external sound output device 80 is activated, the use state can be recognized as the first use state.

In such a configuration, if the above-described function accompanying the sound output by the external sound output device 80 is activated by the function operation unit 71 in a state in which the resonant frequency fc (a predetermined frequency) of the main antenna 61 has been modified to a higher frequency by the first frequency modification unit 63, the control unit 70 controls the first frequency modification unit 63 to modify the frequency, which has been modified to the higher frequency, to a lower frequency (e.g., the original resonant frequency fc of the main antenna 61).

Figure 3B:
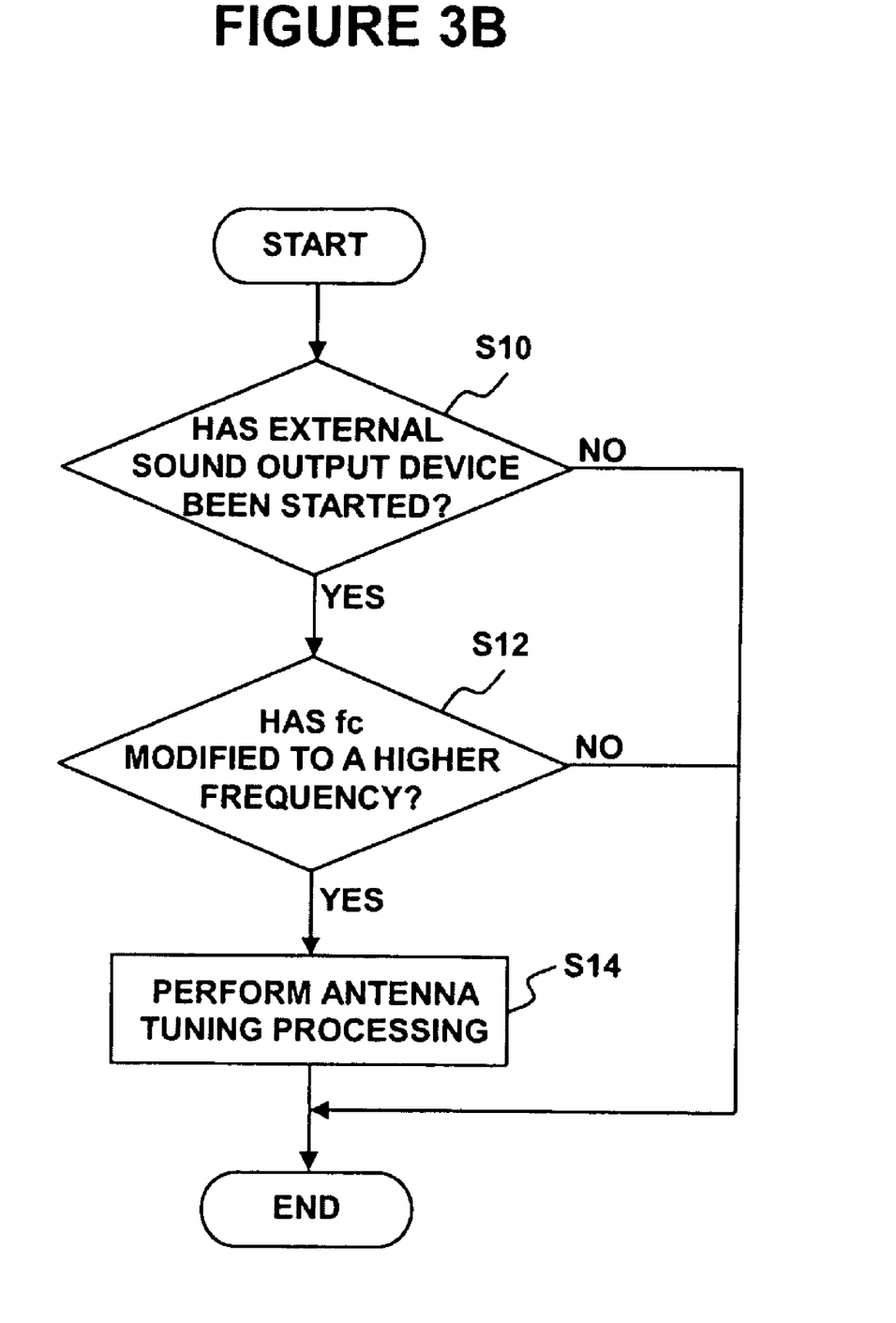

FIG. 3B illustrates a flowchart of an operation performed if the external sound output device 80 is activated, in accordance with one embodiment of the invention. At Step S10, the control unit 70 (FIG. 2) determines whether or not the external sound output device 80 has been activated (e.g., has a function accompanying a sound output by the external sound output device 80 been started?). In one embodiment, this determination is made based on a state of electrical connectivity between the device 80 and a connector thereof (not shown). If the external sound output device 80 has been started (YES), the procedure proceeds to Step S12. If the external sound output device 80 has not been started (NO), the procedure ends.

At Step S12, the control unit 70 determines whether or not the resonant frequency fc of the main antenna 61 has been modified to a higher frequency. If the resonant frequency fc of the main antenna 61 has been modified to a higher frequency (YES), the procedure proceeds to Step S14. If the resonant frequency fc of the main antenna 61 has not been modified to a higher frequency (NO), the procedure ends.

At Step S14 the control unit 70 performs antenna tuning processing to modify the frequency, which has been modified to the higher frequency, to a lower frequency. In one embodiment, the lower frequency is the original resonant frequency fc of the main antenna 61. However, in alternative embodiments, the lower frequency may be different than the original resonant frequency fc, depending on desired performance characteristics in accordance with various applications.

A specific configuration example of the first frequency modification unit 63 is described below.

Figure 4:
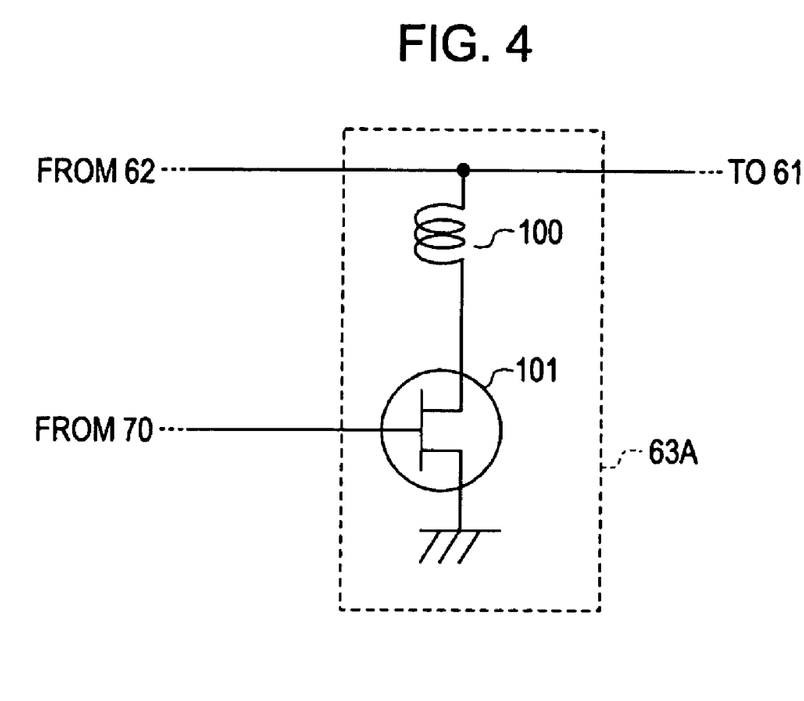
FIG. 4 illustrates a first configuration of a frequency modification unit of a cellular phone according to one embodiment of the invention.

First configuration example: As illustrated in FIG. 4, a first frequency modification unit 63A is formed by a coil 100 and a switching element 101, which are connected in series. The coil 100 has a predetermined inductance, and is used for matching of the main antenna 61. In one embodiment, the switching element 101 is formed by a field effect transistor (FET), for example.

The control unit 70 brings the switching element 101 into an ON state or an OFF state in accordance with the use state, to thereby modify the resonant frequency fc of the main antenna 61.

With a configuration including a plurality of combinations of the coil 100 and the switching element 101, the resonant frequency fc of the main antenna 61 can be modified at multiple stages. Further, in the first configuration example, the coil 100 is used as a component of the first frequency modification unit 63A. However, the component of the first frequency modification unit 63A is not limited thereto. Thus, a capacitor may be used instead.

Figure 5:
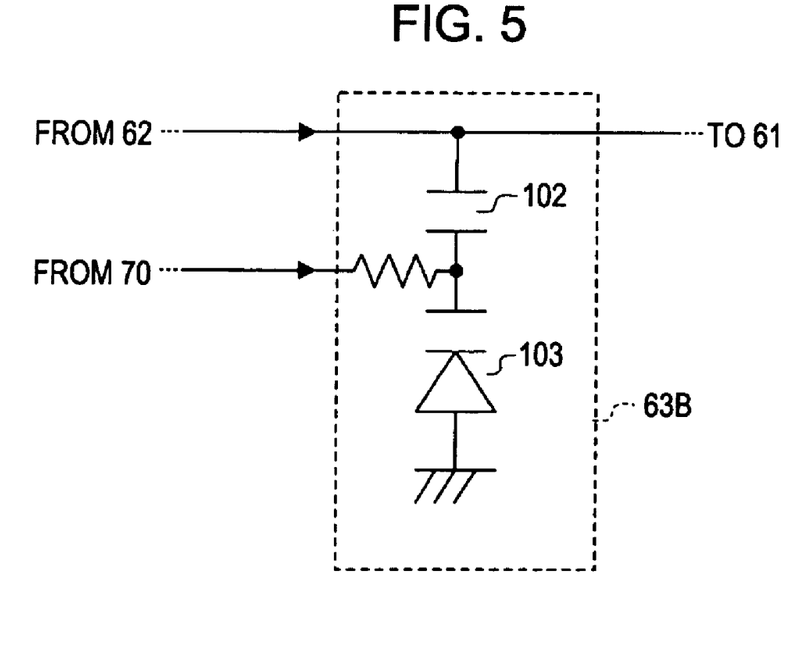
FIG. 5 illustrates a second configuration of a frequency modification unit of a cellular phone according to one embodiment of the invention.

Second configuration example: As illustrated in FIG. 5, a first frequency modification unit 63B is formed by a capacitor 102 and a variable capacitance diode 103, which are connected in series. The capacitor 102 has a predetermined capacitance, and is used for matching of the main antenna 61.

In accordance with the use state, the control unit 70 supplies a reverse bias voltage to the variable capacitance diode 103. The capacitance of the variable capacitance diode 103 varies in accordance with the voltage value of the reverse bias voltage supplied by the control unit 70. In accordance with the value of the voltage applied to the variable capacitance diode 103 by the control unit 70, the resonant frequency fc of the main antenna 61 is modified.

Figure 6:
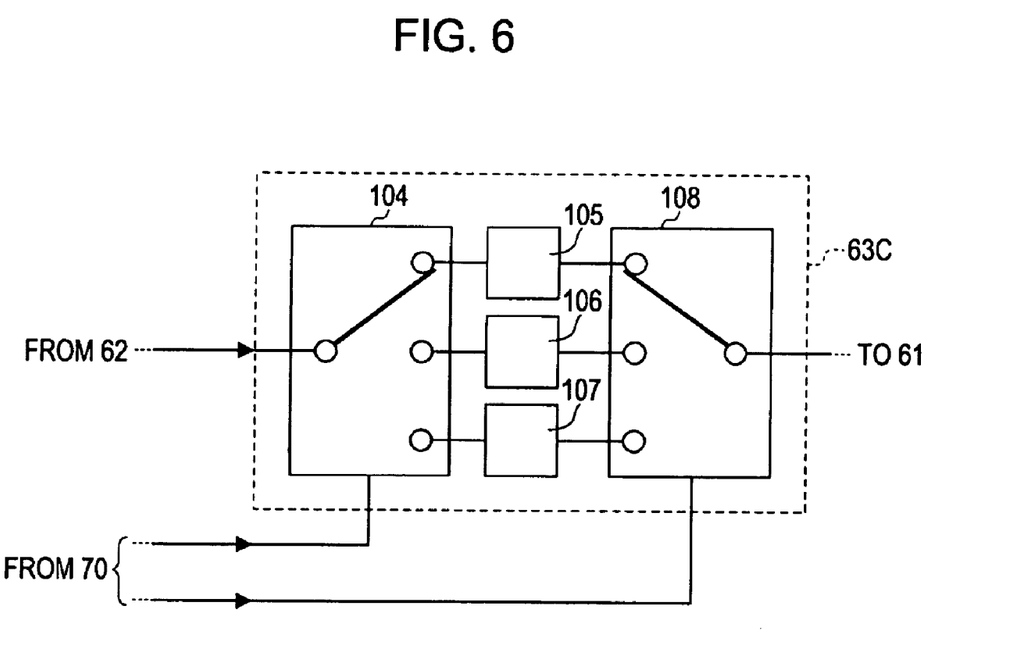
FIG. 6 illustrates a third configuration of a frequency modification unit of a cellular phone according to one embodiment of the invention.

Third configuration example: As illustrated in FIG. 6, a first frequency modification unit 63C is formed by a first switch unit 104, a first element 105, a second element 106, a third element 107, and a second switch unit 108. The first switch unit 104 switches a signal supplied by the first communication processing unit 62. The second switch unit 108 switches a signal supplied by the first to third elements 105 to 107. The first element 105, the second element 106, and the third element 107 are configured to have different circuit constants from one another.

In accordance with the use state, the control unit 70 performs a switching control by interlocking the first switch unit 104 and the second switch unit 108. For example, the control unit 70 switches the first switch unit 104 and the second switch unit 108 to select the first element 105 in the first use state, to select the second element 106 in the second use state, and to select the third element 107 in the third use state.

As described above, the cellular phone apparatus 1 according to the present embodiment includes the control unit 70 which controls the first frequency modification unit 63 to modify the resonant frequency (a predetermined frequency) of the main antenna 61 in accordance with the activation state of the functions activated by the function operation unit 71. Therefore, on the basis of the state of use by the user, which is derived from the activation state of the functions, the modification (e.g., tuning) of the resonant frequency of the antenna can be performed to constantly obtain a favorable antenna performance.

According to the present embodiment, the resonant frequency of the antenna is modified in accordance with the activation state of the functions. Therefore, it is possible to provide a communication apparatus capable of securing the favorable antenna performance without involving undesired complications in the structure of the communication apparatus hardware.

The cellular phone apparatus 1 according to the present embodiment does not require a detector for detecting the state of use by the user. Therefore, the structure of the apparatus can be simplified.

In the present embodiment, the use state is simply classified into three states. However, the present invention is not limited thereto. Thus, the present invention may be configured such that the resonant frequency fc of the main antenna 61 is preferably modified in more than three use states.

Next, another embodiment is described below. Since a cellular phone apparatus in this embodiment is similar to the above-described cellular phone apparatus 1, only differences will be described hereinafter. Similar or like reference numerals are attached to elements corresponding to those of the above-described embodiment and a description regarding common elements is omitted to avoid the overlap.

Figure 7:
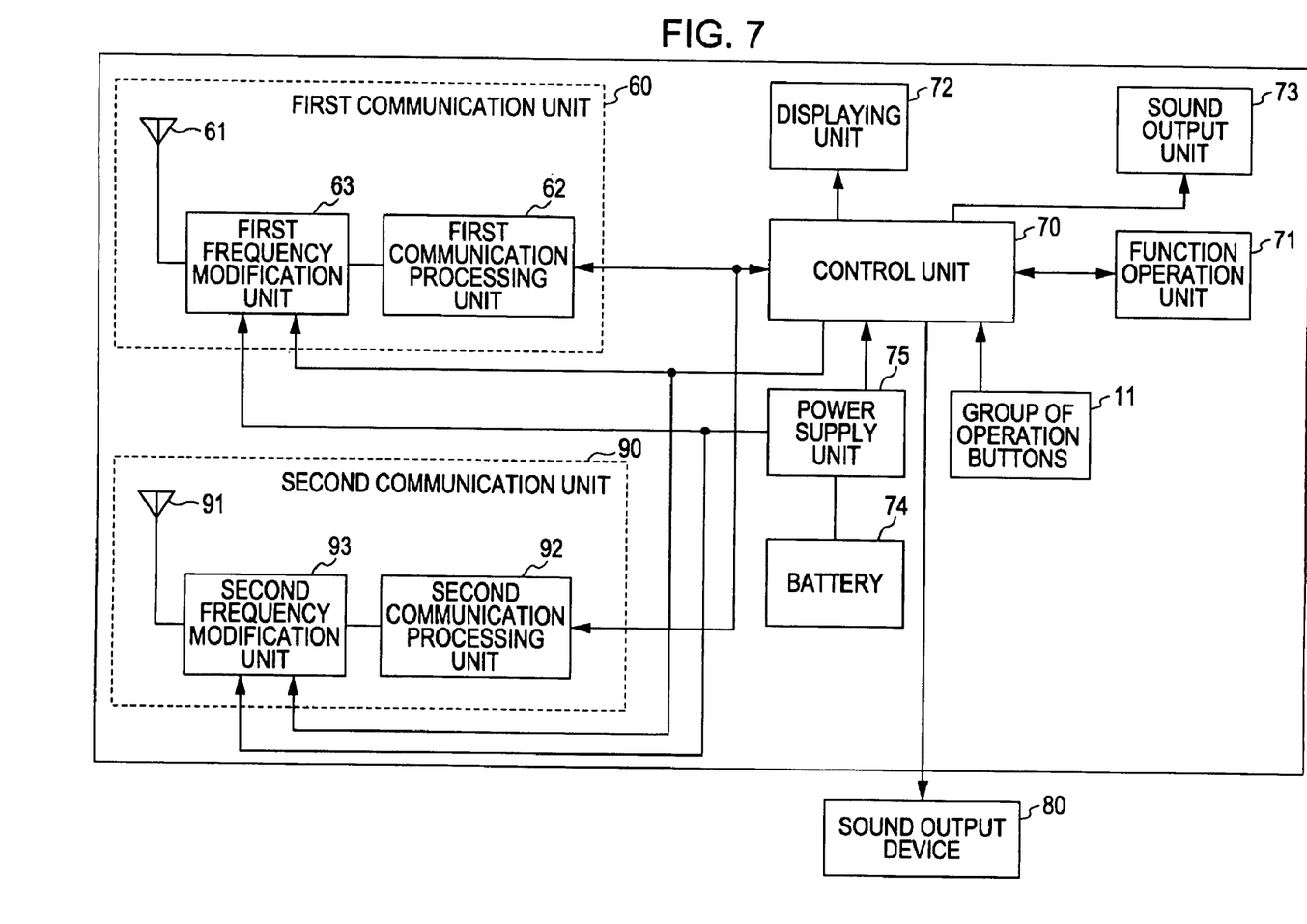
FIG. 7 is a functional block diagram of a process executed by a cellular phone according to another embodiment of the invention.

As shown in FIG. 7, the cellular phone apparatus 1 further includes a second communication unit 90 compared to the cellular phone apparatus 1 shown in FIG. 2. The second communication unit 90 makes it possible to communicate with an external apparatus within a short distance of the cellular phone 1. The short-distance communication is, but not limited to RFID (Radio Frequency Identification), Infrared data communication, Bluetooth™ and wireless LAN.

The second communication unit 90 includes an antenna 91 for short-distance communication, a second communication processing unit 92, and a second frequency modification unit 93 (second frequency modification means). The antenna 91 has a resonance frequency fd (second frequency). The second communication processing unit 92 performs signal processing such as modulation processing or demodulation processing. The second frequency modification unit 93 modifies the resonant frequency fd of the antenna 91.

The antenna 91 communicates with an external apparatus which is different from a base station in a frequency band near 13.56 MHz, for example.

The cellular phone apparatus 1 may have two or more short-distance communication functions, for example, a Bluetooth™ function and another short-distance communication function which is not a Bluetooth™ function. In this case the apparatus 1 has a third communication unit (not shown in FIG. 7) including the antenna for Bluetooth™ which allows communication with external apparatus in a frequency band near 2.45 GHz, for example.

The second communication processing unit 92 performs modulation processing of a signal received by the antenna 91 and provides the processed signal to the control unit 70. Further, the second communication processing unit 92 also performs demodulation processing of a signal provided by the control unit 70 and transmits the processed signal to an external apparatus via the antenna 91. The second frequency modification unit 93 modifies the resonant frequency (fd) of the antenna 91 to a higher frequency or a lower frequency in accordance with the control by the control unit 70.

The function operation unit 71 activates a predetermined function in accordance with the control by the control unit 70. For example, in the reception of a phone call, the function operation unit 71 activates a phone call function (a function using radio wave transmitted or received through the main antenna 61) or a short-distance communication function (a function using radio wave transmitted or received through the antenna for short distance communication 91) upon a predetermined operation of the group of operation buttons 11 by the user. Further, the function operation unit 71 activates a text message function or an Internet browsing function in accordance with the operation of the group of operation buttons 11.

A description regarding the details of the second frequency modification unit 93 is omitted to avoid the overlap since the second frequency modification unit 93 has the same principles and structures, described as three configuration examples in FIGS. 4 to 6, of the first frequency modification unit 63.

The power supply unit 75 converts power supplied from the battery 74 to a predetermined voltage and supplies the converted power to the second communication unit 90 as well as the first communication unit 60 and the control unit 70.

Figure 8:
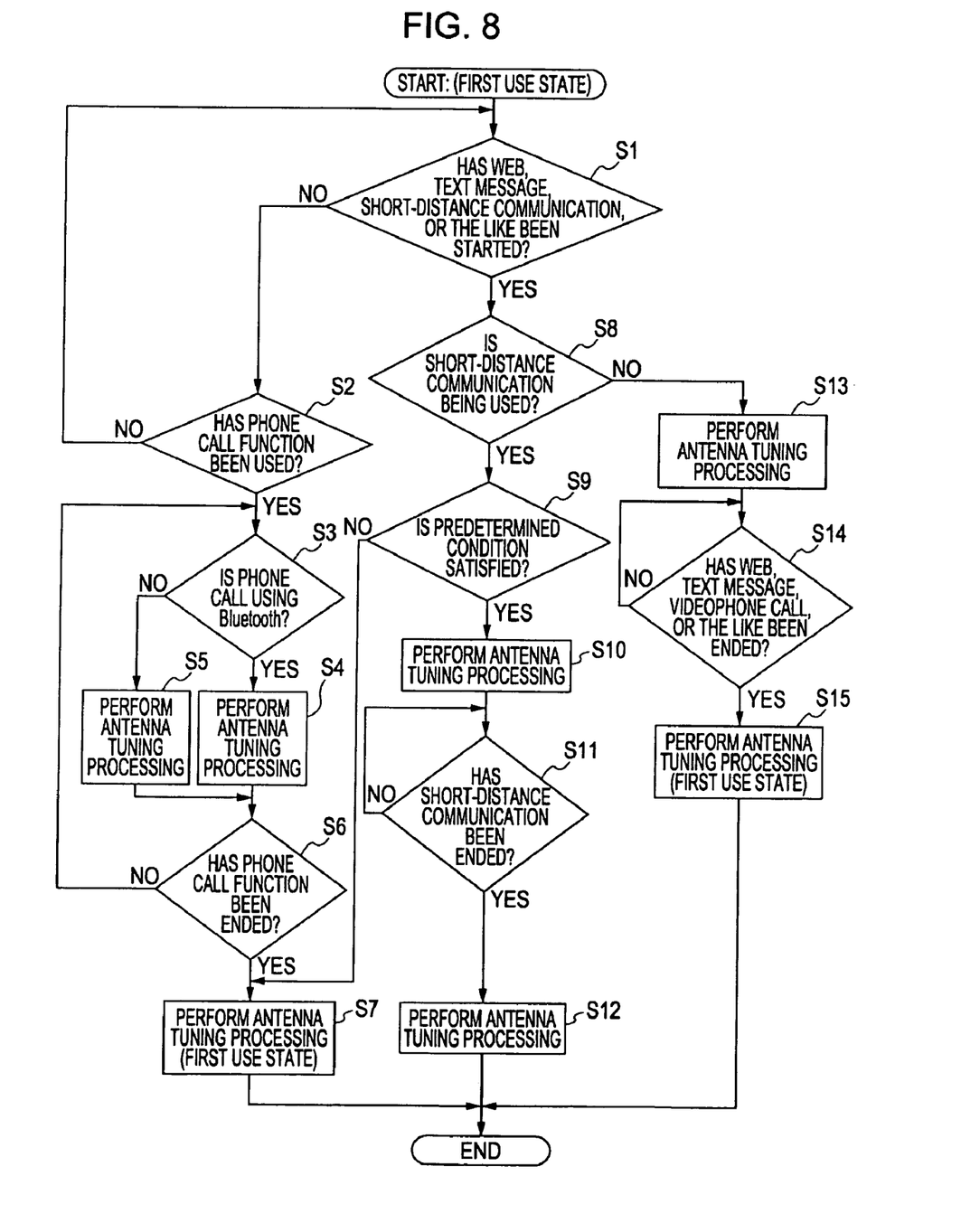
FIG. 8 is a flowchart of an operation performed by a control unit of a cellular phone according to another embodiment of the invention.

Herein, an operation of the control unit 70 is described with reference to the flowchart of FIG. 8. In the present embodiment, the "first use state" and the "second use state" are the same as the previous embodiment but the "third use state" is slightly different because of the short-distance communication function. The "third use state" represents an activated state of a predetermined function activated by the function operation unit 71 (e.g., a function accompanying display by the displaying unit 72, such as the text message function, the Internet browsing function (Web function), a videophone call function, a hands-free call function, a function accompanying operation by the group of operation buttons 11, or a short-distance communication function. Therefore, in one embodiment, the "third use state" indicates a state in which the user is assumed to be viewing the displaying unit 72 while holding the cellular phone apparatus 1 in his or her hand, or to be operating the group of operation buttons 11, without pressing the cellular phone apparatus 1 against his or her face, or to be performing a short-distance communication with an external apparatus while holding the cellular phone apparatus 1.

Hereinafter, the cellular phone apparatus 1 is described as one having both a Bluetooth™ function and another short-distance communication function which is not a Bluetooth™ function.

At Step S1, the control unit 70 determines whether or not the use state has shifted to the use state of functions other than a phone call function, for example, to the use state of a Web function, a text message function, a short-distance communication function, or the like (the third use state). If the use state has shifted to the use state of one of these functions which is in the third use state (YES), the procedure proceeds to Step S8. If the use state has not shifted to the use state of these functions which is out of the third use state (NO), the procedure proceeds to Step S2.

At Step S2, the control unit 70 determines whether or not the use state has shifted to the use state of the phone call function (the second use state). If the use state has shifted to the second use state (YES), the procedure proceeds to Step S3. If the use state has not shifted to the second use state (NO), the procedure returns to Step S1.

In Step S3, when a phone call function is in use, the control unit 70 determines whether or not the function operation unit 71 performs an operation of a short-distance communication function that uses the antenna for Bluetooth™.

Using an external device or equipment which can transmit and receive signals in the frequency band near 2.45 GHz, the short-distance communication function operates such that an audio signal concerning a phone call function is transmitted to and received from the external equipment, using the antenna for Bluetooth™. Accordingly, a phone call function is made available using the external equipment which can transmit and receive the signal of the frequency band near 2.45 GHz.

If the control unit 70 decides that the short-distance communication function using the antenna for Bluetooth™ is in use (Yes), the procedure proceeds to Step S4. If the control unit 70 decides that the short-distance communication function using the antenna for Bluetooth™ is not in use (No), the procedure proceeds to Step S5.

At Step S4, the control unit 70 performs antenna tuning processing. Specifically, when the resonance frequency of the main antenna 61 is modified to a fourth frequency in Step S5 described later, the control unit 70 controls the first frequency modification unit 63 to cancel the modification made in Step S5 and to tune the resonance frequency of the main antenna 61 to an original resonance frequency fc.

On the other hand, when the resonance frequency of the main antenna 61 is fc at the beginning of Step S4, no antenna tuning processing is performed. That is, the resonance frequency fc of main antenna 61 is maintained as it is in this case.

Thus, performing antenna tuning processing or not performing it is based on the following presumption.

That is, when it is determined that the short-distance communication function using the antenna for Bluetooth™ is operating, a user is possibly enjoying the phone call function using the short-distance communication (use state 1) while placing the cellular phone apparatus 1 on a desk. In this case, the resonance frequency fc of main antenna 61 does not fall by pressing the user's face on the cellular phone apparatus 1.

At Step S5, the control unit 70 performs antenna tuning processing. Specifically, the control unit 70 controls the first frequency modification unit 63 to modify the resonance frequency of the main antenna 61 fc to a fourth frequency that is higher than a third frequency described later.

Even if the resonance frequency fc of the main antenna 61 falls by pressing a user's face on a cellular phone apparatus 1 (use state 2) when the phone call function is operating, control unit 70 controls the first frequency changing unit 63 to shift to the higher frequency, thereby reducing or eliminating degradation of the performance of main antenna 61.

In Step S6, control unit 70 decides whether or not the phone call function is ended. If the phone call function is ended (Yes), the procedure proceeds to Step S7. If the phone call function is still in use (No), the procedure returns to Step S3.

In Step S7, the control unit 70 performs antenna tuning processing. Specifically, if the resonance frequency of the main antenna 61 is changed to the fourth frequency in the Step S5, the control unit 70 controls the first frequency changing unit 63 to change the fourth frequency to the original resonance frequency fc. If the resonance frequency of the main antenna 61 is fc, it remains at this frequency.

In Step S8, the control unit 70 determines whether or not the function activated by the operation unit 71 is a short-distance communication function. If the control unit 70 determines that the function activated by the operation unit 71 is a short-distance communication function (Yes), the procedure proceeds to Step S9. If not (No), the procedure proceeds to step S13.

In Step S9, the control unit 70 determines whether or not the short-distance communication function activated by the operation unit 71 satisfies a predetermined condition. In one embodiment, the condition is, but not limited to, whether the short-distance communication function is one using the antenna for Bluetooth™ communications. If it determines that the antenna for Bluetooth™ is not in use (that is, another function is operating) (Yes), the procedure proceeds to Step S1. If it determined that the antenna for Bluetooth™ is in use (No), it is assumed that the user is neither looking at the display while holding the cellular phone apparatus 1 nor operating the group of operation buttons 11. Further, it is also assumed that a user's face is not pressed to the apparatus 1 and a use state 1 is assumed. Accordingly, as the condition is not satisfied, the procedure proceeds to Step S7 for tuning of the resonance frequency of the main antenna 61 to the original frequency fc.

In Step S10, the control unit 70 performs antenna tuning processing. Specifically, the control unit 70 controls the first frequency modification unit 63 to change the resonance frequency fc of the main antenna 61 to a third frequency which is lower than the fourth frequency and the second frequency modification unit 93 to change the resonance frequency fd of the antenna 91 for the short-distance communication to a desired higher frequency.

The reason why antenna tuning processing is performed in this way is a high possibility that the user is enjoying the short-distance function (use state 2) with the cellular phone apparatus 1 in his or her hand when it is determined that a short-distance function, which is not Bluetooth,™ is activated. In that case, there is a possibility that the resonance frequency fc of the main antenna 61 and the resonance frequency fd of the antenna 91 for non-Bluetooth™ short-distance communication will be shifted to a lower frequency.

Thus, under control of the control unit 70, the first frequency modification unit 63 shifts the resonance frequency fc to a higher frequency and the second frequency modification unit 93 shifts the resonance frequency fd to a higher frequency, thereby preventing the degradation of the performance of the main antenna 61 and the antenna 91 for the short-distance communication.

At Step S11, the control unit 70 determines whether or not the use of the short-distance communication function has been ended. If it has been ended (YES), the procedure proceeds to Step S12. If not (NO), the process of Step S11 is repeated.

At Step S12, the control unit 70 performs antenna tuning processing. Specifically, the control unit 70 controls the first frequency modification unit 63 to return the third frequency of the main antenna modified in the step S10 to the resonance frequency fc. At the same time, the control unit 70 controls the second frequency modification unit 91 to return the frequency of the antenna 91 for the short-distance communication modified in the step S10 to the resonance frequency fd.

At Step S13, the control unit 70 performs antenna tuning processing. Specifically, the control unit 70 controls the first frequency modification unit 63 to modify the resonance frequency fc of the main antenna 61 to the third frequency which is lower than the fourth frequency. In this case, since the short-distance function is not active and the resonance frequency fd of the antenna for the short-distance communication 91 is not modified to a higher frequency, unlike in step S10.

As described above, when it is determined that a function other than a short-distance function such as web function or email function and the like is activated, the antenna tuning is performed based on the assumption that it is highly likely that a user of the cellular phone apparatus 1 is holding the cellular phone apparatus 1 in his or her hand (use state 2) and that it is possible that the resonance frequency fc of the main antenna 61 has dropped to a lower frequency even though the user's face may not be pressed against the cellular phone apparatus 1.

Therefore, in such a scenario, the tuning makes the resonance frequency fc higher thereby preventing the radiation efficiency of the main antenna 61 from degrading.

At Step S14, the control unit 70 determines whether or not the use of a function other than a short-distance communication function, such as a web function or email function, for example, has been ended. If the function has been ended (YES), the procedure proceeds to Step S15. If not (NO), the process of Step S14 is repeated.

At Step S15, the control unit 70 performs antenna tuning processing. Specifically, the control unit 70 controls the first frequency modification unit 63 to return the third frequency of the main antenna modified in the step S13 to the resonance frequency fc which was the original resonance frequency.

In the present embodiment, at Step S9, the control unit determines 70 whether or not a predetermined condition is fulfilled on the basis of whether or not the short-distance communication function activated by the operation unit 71 is the one using the antenna for Bluetooth™. However, the present invention is not limited to this. The predetermined condition may be a different one.

For example, in one embodiment, a predetermined condition may be based on the length of the operating time of the short-distance communication function activated by the operation unit 71. If the length is equal to or less than a predetermined length, the control unit 70 determines the condition is fulfilled, and assumes that the user is still holding the cellular phone apparatus 1. On the other hand, if the length is more than the predetermined length, the control unit 70 determines the condition is not fulfilled, and assumes that the user is no longer holding the cellular phone apparatus 1.

As another example, when the cellular phone apparatus 1 includes an acceleration detector, the predetermined condition may be an acceleration value. If the acceleration value is equal to or less than a predetermined value, the control unit 70 determines the condition is fulfilled, and assumes that the user is holding the cellular phone apparatus 1. On the other hand, if the value is less than the predetermined length, the control unit 70 determines the condition is not fulfilled, and assumes that the user is holding the cellular phone apparatus 1.

As a further example, the cellular phone apparatus 1 may be designed to be installed on a stand (e.g., charging stand for charging battery charger 74) and the control unit 70 can detect whether or not the apparatus 1 is installed on the stand, the predetermined condition is the installation state of the apparatus 1. If the control unit 70 detects that the apparatus 1 is not installed on the stand, the control unit 70 determines the condition is fulfilled, and assumes that the user is holding the cellular phone apparatus 1. On the other hand, if the control unit 70 detects that the apparatus 1 is installed on the stand, the control unit 70 determines the condition is fulfilled, and assumes that the user is not holding the cellular phone apparatus 1.

Although embodiments of the present invention have been described with reference to the accompanying drawings in the above, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A communication apparatus comprising:
   a first antenna having a first resonant frequency;
   a first frequency modification unit for modifying the first resonant frequency of the antenna;
   a function operation unit activating a plurality of functions;
   a control unit controlling the first frequency modification unit to modify the first resonant frequency in accordance with an operational state of the communication apparatus, based on a function activated by the function operation unit, wherein upon activation of a specific function from among the plurality of functions by the function operation unit, the control unit controls the first frequency modification unit to modify the first resonant frequency to a higher frequency;
   a display unit; and
   a sound output unit, wherein, when the specific function comprises operating the display unit, or operating the function operation unit, the resonant frequency is set to a first frequency, and wherein, when the specific function comprises outputting sound by the sound output unit, the resonant frequency is set to a second frequency higher than the first frequency.

2. The communication apparatus according to claim 1, further comprising a displaying unit, wherein the specific function comprises operating a display unit coupled to the communication apparatus.

3. The communication apparatus according to claim 1, further comprising an operation unit, wherein the specific function comprises operating the operation unit.

4. The communication apparatus according to claim 1, wherein the specific function comprising outputting sound by the sound output unit includes a phone call function using radio waves transmitted and received by the first antenna.

5. A communication apparatus comprising:
   a first antenna having a first resonant frequency;
   a first frequency modification unit for modifying the first resonant frequency of the antenna;
   a function operation unit activating a plurality of functions;
   a control unit controlling the first frequency modification unit to modify the first resonant frequency in accordance with an operational state of the communication apparatus, based on a function activated by the function operation unit, wherein, upon activation of a specific function from among the plurality of functions by the function operation unit, the control unit controls the first frequency modification unit to modify the first resonant frequency to a higher frequency; and
   a sound output unit, wherein the specific function comprises outputting a sound by the sound output unit wherein the sound output is performed by an external sound output device, and wherein, when a function accompanying the sound output by the sound output device is activated by the function operation unit in a state in which a resonant frequency of the first antenna has been modified to a higher frequency by the frequency modification unit, the control unit controls the frequency modification unit to return the resonant frequency to a lower frequency.

6. The communication apparatus according to claim 5, wherein the lower frequency is the first resonant frequency.

7. A communication apparatus having a plurality of functions comprising:
   a first antenna;
   a function activator activating one of the plurality of functions;
   a frequency modifier for modifying a first resonant frequency of the first antenna in accordance with an operational state of the communication apparatus, based on a type of function activated; and
   a second antenna having a second resonant frequency,
   wherein the plurality of functions include one or more short-distance communication functions using the second antenna for transmitting or receiving radio signals and if the function activated by the function operation unit is one of the short-distance communication functions, the frequency modification unit modifies the first resonant frequency to a higher frequency if a predetermined condition is fulfilled, or does not modify the first resonance frequency, if the predetermined condition is not fulfilled;
   wherein the short-distance communication functions include a first short-distance communication function and a second short-distance communication function comprising a Bluetooth function and the predetermined condition is fulfilled if the function activated by the function operation unit is the first short-distance communication function and is not fulfilled if the function activated by the function operation unit is the second short-distance communication function.

8. The communication apparatus according to claim 7, wherein, if the function activated by the function operation unit is one of the short-distance communication functions, the frequency modifier modifies the first resonant frequency to a higher frequency.

9. The communication apparatus according to claim 7, further comprising a second frequency modification unit for modifying the second resonant frequency.

10. The communication apparatus according to claim 9, wherein, when the function activated by the function operation unit is one of the short-distance communication functions, the second frequency modification unit controlled by the control unit modifies the second resonant frequency to a higher frequency.

11. A communication apparatus having a plurality of functions comprising:
    a first antenna;
    a function activator activating one of the plurality of functions;

a frequency modifier for modifying a first resonant frequency of the first antenna in accordance with an operational state of the communication apparatus, based on a type of function activated;

a second antenna having a second resonant frequency, wherein the plurality of functions include one or more short-distance communication functions using the second antenna for transmitting or receiving radio signals; and a second frequency modification unit for modifying the second resonant frequency wherein, when the function activated by the function operation unit is one of the short-distance communication functions, the second frequency modification unit controlled by the control unit modifies the second resonant frequency to the higher frequency if the predetermined condition is fulfilled, or does not modify the second resonance frequency if the predetermined condition is not fulfilled.

12. The communication apparatus according to claim 11, wherein the short-distance communication functions include a first short-distance communication function and a second short-distance communication function comprising a Bluetooth™ function and wherein the predetermined condition is fulfilled if the function activated by the function operation unit is the first short-distance communication function and is not fulfilled if the function activated by the function operation unit is the second short-distance communication function.

13. A method of communicating with a wireless communication device, comprising:

determining which function of a plurality of functions is currently activated by the wireless communication device; and modifying a resonant frequency of a first antenna of the wireless communication device in accordance with an operational state of the wireless communication device, based on the function that is currently activated, wherein the plurality of functions comprises a phone call function, a Web function, and a display function and if the currently activated function is a phone call function, the resonant frequency is adjusted to a first higher frequency, and if the currently activated function is a Web or display function, the resonant frequency is adjusted to a second higher frequency that is higher than an original resonant frequency of the first antenna but lower than the first higher frequency.

14. The method of claim 13 wherein modifying the resonant frequency comprises modifying the resonant frequency to a higher frequency.

15. The method of claim 13 further comprising:

determining when the currently activated function has ended; and adjusting the resonant frequency of the first antenna to the original resonant frequency.

16. The method of claim 13 wherein the plurality of functions comprises an external sound output device function, wherein if the currently activated function is the external sound output device function, the resonant frequency is adjusted to or maintained at the original resonant frequency.

17. A method of communicating with a wireless communication device, comprising:

determining which function of a plurality of functions is currently activated by the wireless communication device; and modifying a resonant frequency of a first antenna of the wireless communication device in accordance with an operational state of the wireless communication device, based on the function that is currently activated, wherein the plurality of functions comprises a first short-distance communication function and a second short-distance communication function comprising a Bluetooth communication function, wherein if the currently activated function is the first short-distance communication function, a resonant frequency of a second antenna used for short distance communications is adjusted to a higher frequency; and if the currently activated function is the second short-distance communication function, the resonant frequency of the first antenna is adjusted to or maintained at the original resonant frequency of the first antenna and a resonant frequency of the second antenna is maintained at an original resonant frequency of the second antenna.

* * * * *